E. ZUEBLIN.
PROCESS OF PREPARING MEDICINAL ARTICLES AND PRODUCTS THEREOF.
APPLICATION FILED AUG. 5, 1914.
1,301,210.
Patented Apr. 22, 1919.
2 SHEETS—SHEET 1.
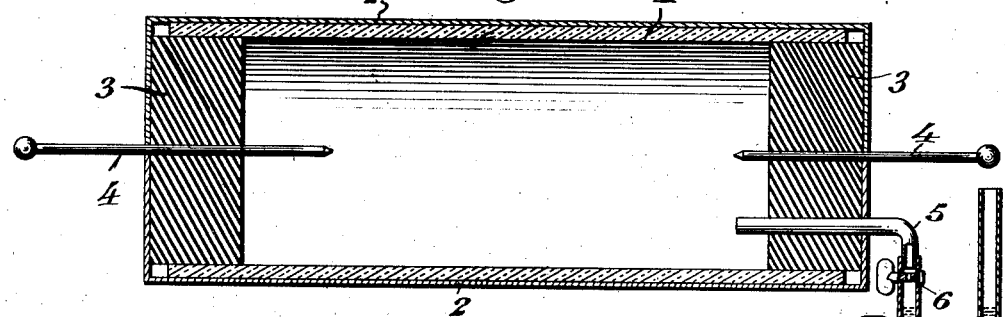
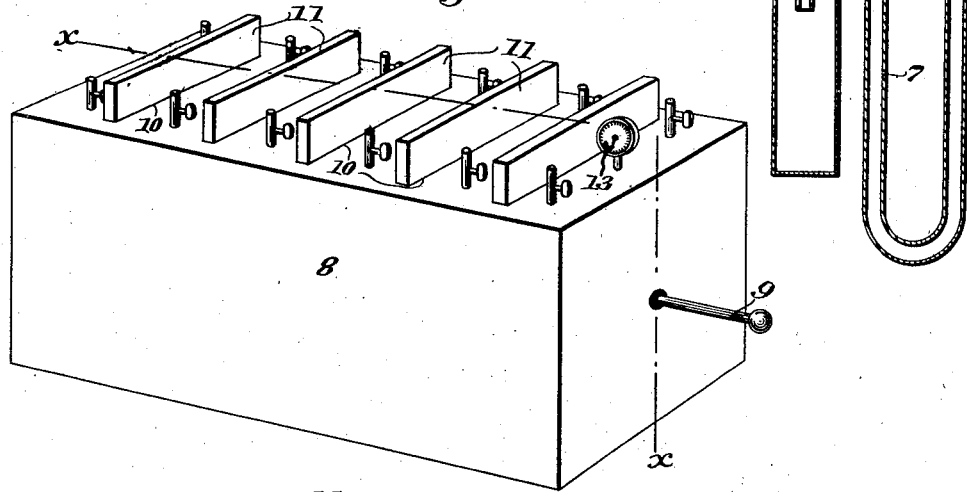
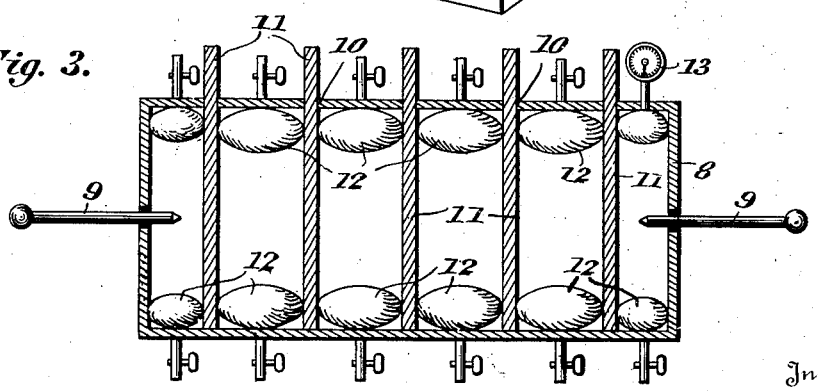

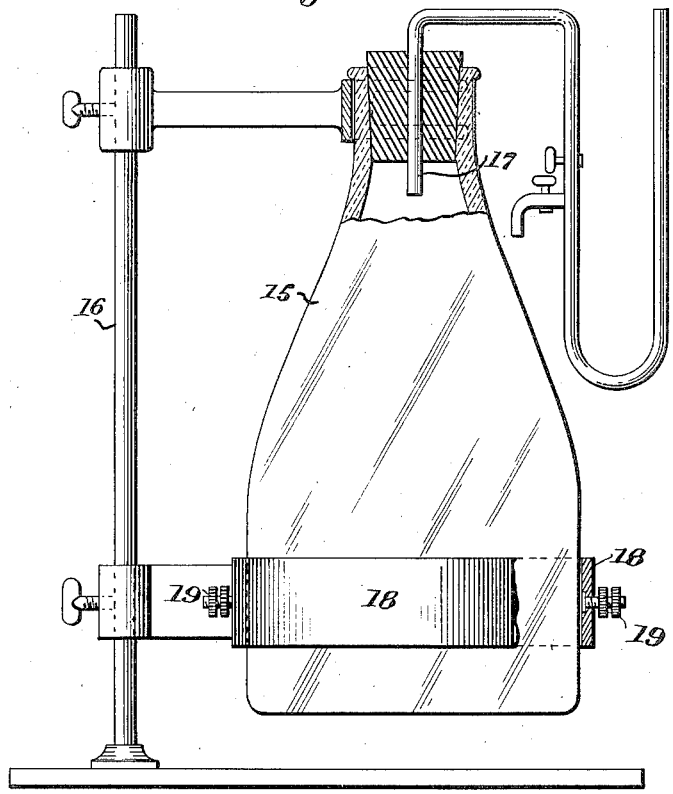
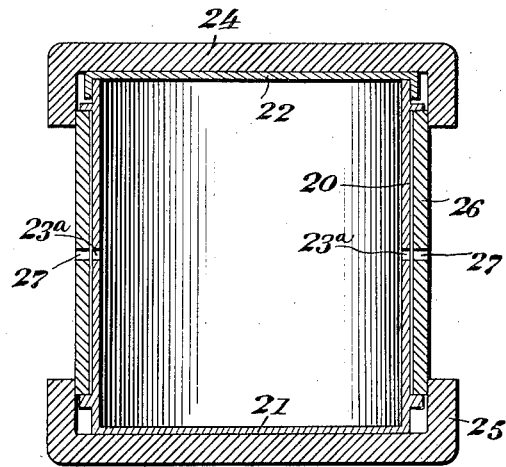

UNITED STATES PATENT OFFICE.

ERNEST ZUEBLIN, OF BALTIMORE, MARYLAND.

PROCESS OF PREPARING MEDICINAL ARTICLES AND PRODUCTS THEREOF.

1,301,210. Specification of Letters Patent. Patented Apr. 22, 1919.

Application filed August 5, 1914. Serial No. 855,095.

*To all whom it may concern:*

Be it known that I, ERNEST ZUEBLIN, a citizen of the Republic of Switzerland, residing at Baltimore, in the State of Maryland, have invented certain new and useful Improvements in Processes of Preparing Medicinal Articles and Products Thereof, of which the following is a specification.

This invention relates to processes of preparing medicinal articles and products thereof; and it comprises a method of imparting additional special healing value to ordinary drugs and medicaments wherein such a material is exposed to the action of a high tension spark or current playing in proximity thereto until such material acquires a measure of radioactivity, the power of ionizing gases in its vicinity and a property of affecting guaiacum and similar oxygen-sensitive reagents; and it further comprises a drug or medicament such as bismuth subnitrate, quinin, vaseline, etc., possessing an imparted radioactivity and power of ionizing gases; all as more fully hereinafter set forth and as claimed.

I have found by experimental research that all medicinal substances possess to a slight extent, a degree of radioactivity, and I have further found that the degree of radioactivity possessed by such medicinal substances can be very greatly increased and can be increased in a regulable manner by the action of high tension electric discharge, particularly such as the brush discharge. Materials which possess a high degree of radioactivity, when placed in the fontactoscope, cause the leaves to fall rapidly and materials which possess such power to a slight degree cause the leaves to fall slowly. The rapidity with which the leaves of the fontactoscope fall depends upon, and is in approximately direct proportion to the degree of radioactivity of the material under investigation. By the fontactoscope it is accordingly possible to measure the degree of radioactivity of the material under investigation, and also to measure, to a certain extent, the medicinal effects produced by treatment with high tension electricity in the manner hereinafter more fully described.

The treatment with electricity, of medicinal preparations or materials, has been found by me to be capable of altering the medicinal effect of medicaments and drugs, this alteration in the medicinal effect being always accompanied by the power of emitting radioactivity rays, and accordingly, the power of causing a more rapid fall of the leaves of the fontactoscope.

I have found that such effects can be produced in the medicinal substances in a cheap, simple and ready manner by exposure to the influence of high tension sparks or currents for suitable lengths of time, and I find further that by such treatment, the medicinal effects of drugs and medicines can be sometimes heightened and in other cases altered in other manners and some other properties of certain medicinal substances can, to a certain extent, be diminished or taken away entirely, and that all these alterations in the medicinal properties and substances under treatment can be effected in a predetermined manner and to a predetermined extent by adjustment of the conditions of the treatment, such as the length of time treated, the potential of the electric discharge and other conditions.

I can not only produce single properties, or increase the degree or amount of single properties, but I can also make various useful combinations of medicinal properties by imparting this power to common medicaments and drugs and by adjusting the conditions of such treatment. This adds materially to the physician's resources as to the treatment of diseases. I can impart, by the treatment hereinafter more fully described, any described and measurable degree of the power of emitting curative rays to the materials under treatment, or, in other words, my process allows a complete control of the medicinal action of the material under treatment.

I have found that by placing materials of many kinds in proximity to, or in, the path of a high tension spark or current and allowing this spark to pass for a desired time, I can impart to such materials the power of emitting rays for a considerable length of time. Upon the time of exposure and the tension and other properties of the spark or current depend not only the strength of these rays but the length of time during which they will be emitted in utilizable strength. After a given preparation has been treated and used to exhaustion or as near thereto as may seem desirable, it may be again treated with the spark and will once more acquire the property of emitting rays. And I find as a matter of fact that it is desirable so to repeat the treatment for the reason that better results are obtained in a second or third treatment; the material appears to acquire the power of becoming more radioactive with less excitation, that is to say, the power of becoming more sensitive or more receptive to the electrical treatment.

The spark used may come from any suitable source, such as the secondary of an induction coil or the electrode of a frictional or other type of static electric machine, such as the well known Wimshurst. It may be made to act on the medicament in any desired way; but it is ordinarily convenient to place a body of the medicament in a tube or the like of non-conducting material and simply allow the spark to pass through. The voltage may be as desired but in ordinary work I find it advantageous to use a voltage of about 100,000 with a separation between the spark terminals of, say, 12 inches. Instead of allowing the spark or current to pass through the body of material, it may be transmitted in proximity thereto without actually contacting therewith as by passing the spark or current along or around a container of insulating material. This is particularly convenient where conductive materials, such as water, wine and aqueous liquids generally, are to be treated for the purpose of rendering the same radioactive. For example a glass bottle of mineral water or wine may be placed in such relation to a pair of electrodes that a spark passes along its length or breadth or around it.

Whatever the apparatus adopted or the source of electricity used, the progress of treatment should ordinarily be followed by determining the amount of imparted radioactivity of the material with an electrometer such as the well known "fontactoscope". The degree of radioactivity to be imparted will of course depend upon the special purpose for which the preparation is desired; something which is a matter of the physician's discretion.

While very many drugs and medicaments may be treated by the present process, I find it is particularly advantageous with bismuth subnitrate. Bismuth subnitrate is a material which may be used internally in a considerable quantity and has useful functions in various stomach and bowel diseases. By imparting to it a certain measure of radioactivity by the method herein described the curative effects of the rays may be applied internally. On the other hand, bismuth subnitrate as an external application may also be usefully made radioactive. As a rule, I employ my process of imparting secondary radioactivity with bulky materials of this nature rather than with readily soluble medicines which are used in homopathic quantities or other very small doses, such as strychnin for example. But when it is desired that the emission of the rays shall take place generally through the system, as in cases of neurasthenia, anemia, etc., it is useful to employ the present process in connection with a freely soluble material which will pass through the stomach walls and into the circulation, such as milk sugar, cane sugar (candy) glucose, etc.

The soluble materials treated as above described, pass through the walls of the stomach or intestines into the blood circulation, and carry with them the radioactive properties acquired by the treatment, and in the blood circulation they exert specific effects, similar to those produced by radium compounds, independently of the therapeutic effects of the untreated materials.

While I regard it as best to impart the radioactivity to the material under treatment directly in the manner described, it may also be imparted indirectly. For this purpose, any suitable inert material, which is best in the shape of plates or the like, may be submitted to the action of the spark for a sufficient length of time to render it highly radioactive and then may be placed in contact with the medicament to be treated. The medicament in turn becomes radioactive at the expense of the energy imparted to and stored up by the plate. For example a metal plate may be rendered radioactive and then washed by or bathed in a liquid, such as wine, which is to be made radioactive.

In the accompanying illustration I have shown more or less diagrammatically certain means adapted for the performance of the described process. In this showing:

Figure 1 is a vertical section of a simple type of apparatus for imparting radioactivity directly;

Fig. 2 is a view in elevation of an apparatus for activating plates;

Fig. 3 is a vertical longitudinal section of the structure of Fig. 2 taken along lines x—x;

Fig. 4 is a vertical section partly in elevation, of an apparatus in which activation is effected by the passage of a high tension current in proximity to the material; and Fig. 5 is a vertical section of an alternative type of apparatus.

In the structure of Fig. 1 element 1 is a cylindrical casing of any suitable insulating, tolerably refractory material. As shown, it is of glass; advantageously of a refractory glass such as is used for combustion tubing. It may be provided with a sleeve or cover 2 of asbestos or other heat insulating material. At the ends it is provided with stoppers 3 which may be of rubber or the like. Through these stoppers pass movable electrodes 4 which may be connected to any source of high tension current. By removing the cover of the glass tube the interior may be seen and the length of the spark gap adjusted. Through one of these end plugs passes tube 5 carrying stop cock 6 and connected with a manometer 7. The manometer serves to indicate the pressure within the apparatus.

In the structure of Figs. 2 and 3 casing 8 of a general box-like form is provided with movable electrodes 9. In the top of the box or casing are slits 10 through which may be inserted plates 11 of metal or other suitable material. It is a useful expedient to maintain the spacing apart of these plates by pneumatic cushions 12. The number of these plates will of course vary with the energy available and the intensity of the secondary radio-activity which it is desirable to impart to the plates. The whole apparatus may be inclosed in a jacket of asbestos (not shown) and may be provided with gage 13 for indicating pressure within the apparatus.

In the structure of Fig. 4, element 15 is shown as a bottle of glass or like material held in ring stand 16. Through the stopper passes gas outlet 17 which may be valved in any suitable way. Around the base of the bottle is mounted a metal ring 18 which may be of lead, copper or other good conductive material. This ring is provided with sockets or binding screws 19 for attaching the terminals of a high potential source of current.

In Fig. 5 an apparatus is shown comprising a cylindrical casing 20 having bottom 21 and top 22. In it are two holes 23ª at diametrically opposite points. This box is provided with lead cover 24 and bottom 25. Between them is a lead annulus or ring 26 provided with orifices 27. Through these orifices when in register with the holes may be inserted electrodes (not shown). On removal of the electrodes, by turning the ring the orifices may be brought out of register and the material in the box maintained for an indefinite period of time.

In the use of the structure shown in Fig. 1 any desired substance which is to be rendered radioactive, such as bismuth subnitrate, powdered soap, potassium or sodium carbonate or bicarbonate, milk sugar, mustard, etc., is placed in tube 1 and the end plugs 3 inserted. The current is now passed through electrodes 4, the spark gap having been adjusted to a suitable distance, until the material within the tube acquires the desired degree of radioactivity. This may be ascertained by removing some of the material and testing it with an electroscope. When the desired degree of radioactivity is acquired, the current is turned off and stopcock 6 closed to permit no further escape of gas. After the apparatus is cooled down to room temperature, the substance in tubes 1 is transferred to bottles of dark glass well sealed and is preserved until wanted.

In the use of the structure of Figs. 2 and 3 plates of any suitable material, such as iron, copper or silver, German silver, etc., in the desired number are inserted through slots 10 and current allowed to pass between electrodes 9. The plates become radioactive and when this radioactivity has reached a desired degree, which may be ascertained by removing a plate and testing with the electroscope, the box and plates are allowed to cool down, the plates removed and contacted with the material, such as milk sugar, which it is intended to render radioactive. If the substance is a liquid the plates may be simply dipped into it. If the plates are to be stored or kept for a time, they should be protected against loss of activity by inclosure in metal casings or by metal screens of varying thickness.

In the use of the structure of Fig. 4, the bottle 15 may be filled with any desired medicament or liquid and the terminals of a source of high tension current connected to 19. High frequency current is then passed through the ring for five minutes or longer, the time depending upon the capacity of the static machine, the amount of substance to be activated and the intensity of radioactivity to be imparted.

In the use of the structure of Fig. 5, the solid substance which may be any desired material used in medicine or surgery is placed in the container 20 and ring 26 turned until the electrode orifices are in register. High tension current or sparks are now sent through the contents of the container from electrodes passing through these orifices. When the material in the container is activated to the desired extent, the electrodes are removed and the lead ring 26 turned until the orifices are out of register. In this position, the contents of the box may be preserved for any desired length of time without any substantial loss of the imparted radioactivity.

Materials treated in the manner described, in addition to their original therapeutic activity, possess a curative radioactivity, and produce, in addition to the therapeutic activity of the untreated material, specific effects similar to those produced by radium compounds. On exposure to gases they produce ionization in such gases and on contacting with tincture of guaiacum they produce a blue colorization. Exposed in the vicinity of a photographic plate, they act upon it by the emission of chemical rays. These materials may be used in medicine in any form, solid, fluid or gaseous, either as such or in combination with other remedies.

The term "radioactive" as employed in this specification, is used to denote certain properties similar to the properties possessed by and emanated from radium and other naturally radioactive substances. When the material is examined under the fontactoscope, such as is employed for measuring the strength of radium preparations generally, it produces an increased ionization of the air, over that found in normal air, this increase being generally shown by a falling of the metallic leaves of the instrument. The treated material further emits rays, which according to the thickness of metallic screens placed above or around it, pass through such screens, in a manner similar to the alpha, beta and gamma rays emanating from radium compounds. The material treated, when subjected to the action of tincture of guaiacum, produces a blue coloration. When the material wrapped in paper is placed near a sensitized photographic plate, the rays will pass through the wrapping, and act upon the plate. The treated substance in all cases causes the leaves of the fontactoscope to fall more rapidly than the same quantity of the untreated substance.

As an example of the radioactive effect produced, digitalis extract, or digitalin or strophanthin when treated in accordance with this process, is found by test with a kymograph to produce an increase in blood pressure, very materially greater than that which would be produced by the same quantity of the untreated substance. The lethal dose of these substances and of other substances, has been shown by experiments, to be considerably reduced, by this activation, which indicates that they have been made more highly active, and in consequence thereof, a much smaller dose of the substance is required to kill an animal.

Clinically, in cases of myocardial dilation, ordinary tablets of digitalis of known strength, even after no clinical treatment, produced as a rule no improvement in the patient. Other tablets of the same strength, when treated in accordance with the present process, and evidenced by their increased strength when measured with the fontactoscope, produced a marked improvement, noticed subjectively by the patient himself, and then objectively by the reduction of the size of the formerly dilated heart, by the slowing down of the pulse rate, and by the increase of the blood pressure.

In another experiment an alkaline powder consisting of a mixture of sodium bicarbonate, sodium sulfate and sodium phosphate, not treated in accordance with this process, when given to a patient with high blood pressure (180 m. m.) did not produce any appreciable change in the blood pressure, but the same size dose of the same mixture of substances, treated in accordance with the process of the present application, produced a quick and decided drop in the abnormally high blood pressure, reducing it to 120 m. m.

A physiological test of bismuth subnitrate or subcarbonate showed that when given alone in doses of 15 grains it would reduce the high acidity in the gastric juice, but also was apt to cause constipation. When either of these bismuth salts were activated, however, they reduced the high acidity in the gastric juice more quickly and effectively and instead of causing constipation, had an appreciable tendency to produce diarrhea. This shows again that there has been added to these bismuth salts by their activation by this process something which changes its action appreciably and decidedly.

What I claim is,—

1. The process of imparting additional medicinal properties to medicaments which comprises exposing such a medicament to the influence of high tension electricity passing in proximity thereto until such medicament becomes radioactive.

2. The process of imparting additional medicinal properties to medicaments which comprises exposing such a medicament to the influence of a high tension spark passing in proximity thereto until such medicament becomes radioactive.

3. The process of imparting additional medicinal properties to medicaments which comprises imparting radioactivity thereto with the aid of energy derived from high tension electricity, in the form of a brush discharge.

4. As a new article of manufacture, a medicinally active material possessing induced radioactivity, having the power of ionizing gases, of reacting with tincture of guaiacum to give a blue coloration and of acting on a photographic plate.

In testimony whereof I affix my signature in presence of two witnesses.

ERNEST ZUEBLIN.

Witnesses:
CHARLES B. MANN, Jr.,
BERTHA K. WALTER.